Oct. 23, 1945.   A. ROBERTSON   2,387,295
CUSHION FOR CONDUIT AND WIRE SUPPORTING CLIPS
Filed Sept. 14, 1943    2 Sheets-Sheet 1
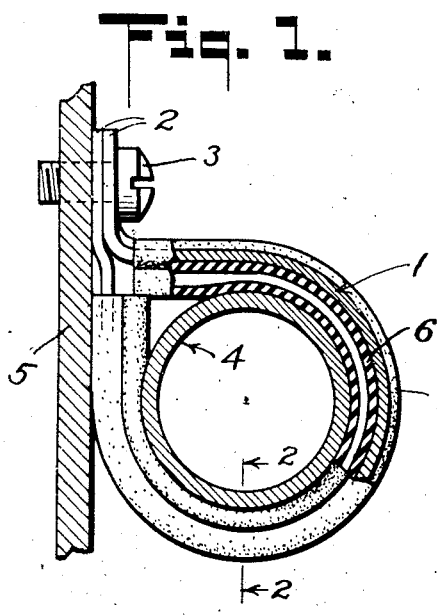
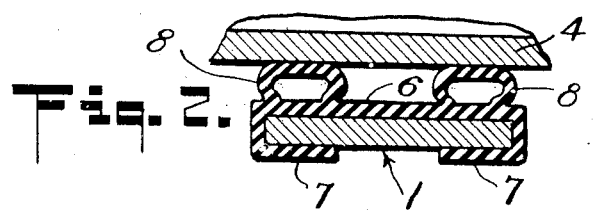
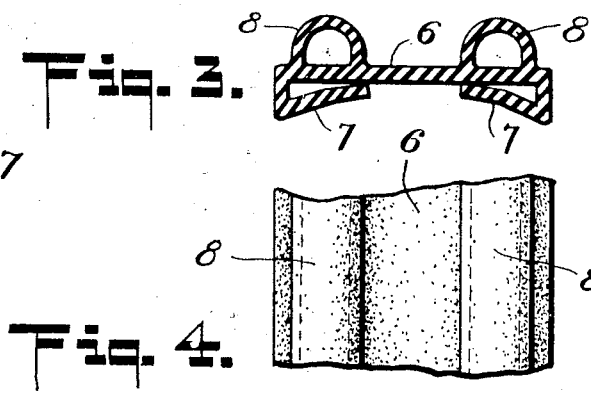
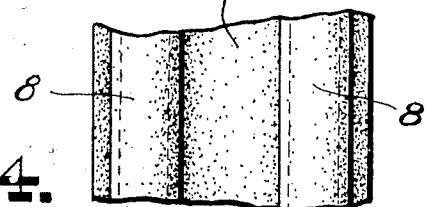
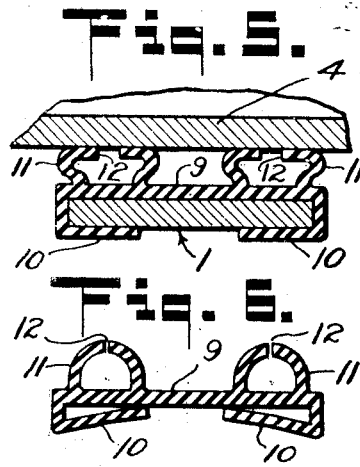
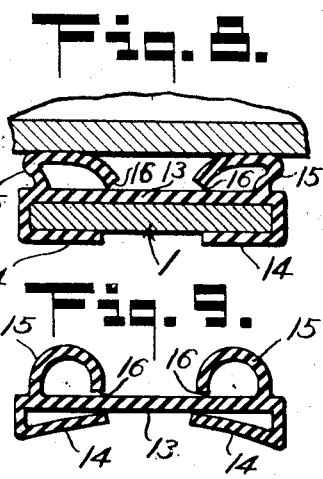
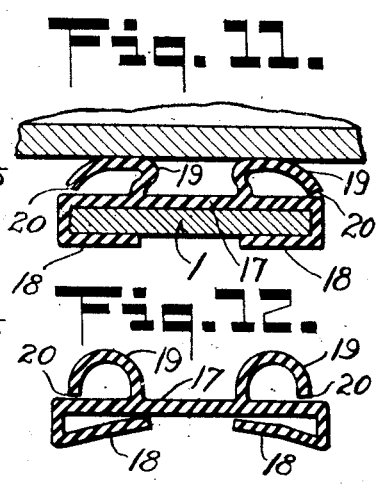
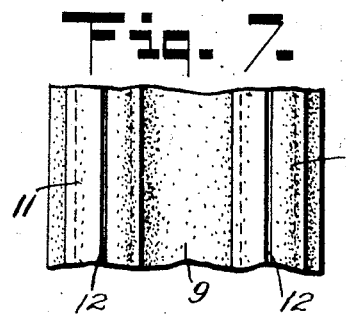
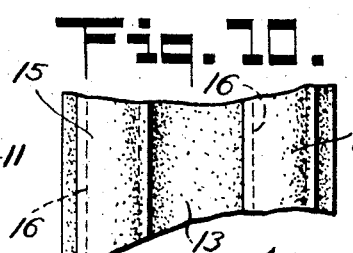
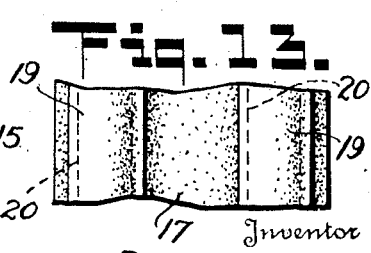
Inventor
ARCHIBALD ROBERTSON
By R. S. Berry
Attorney

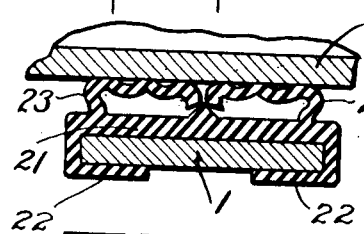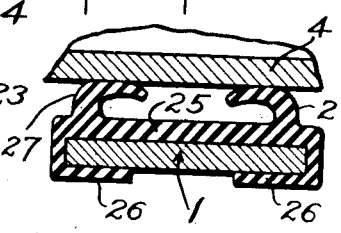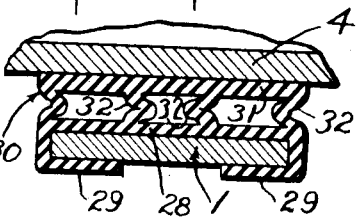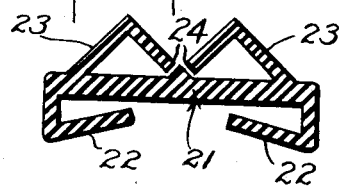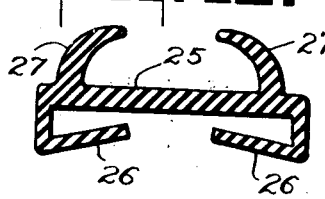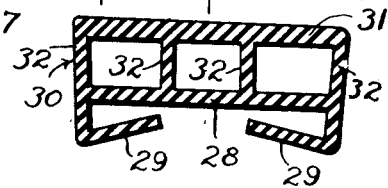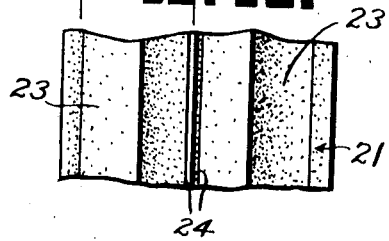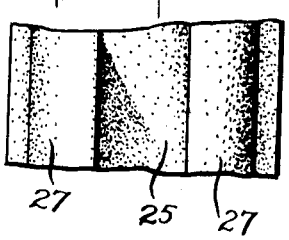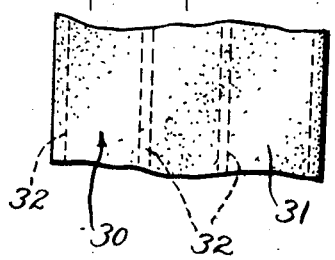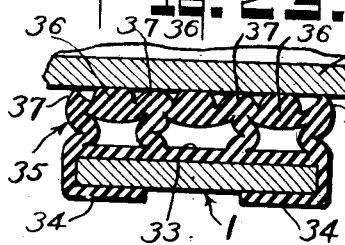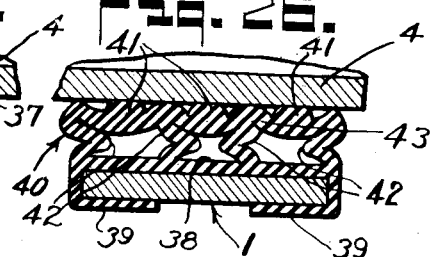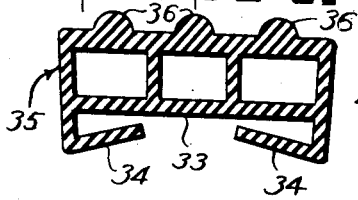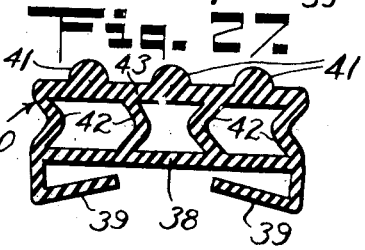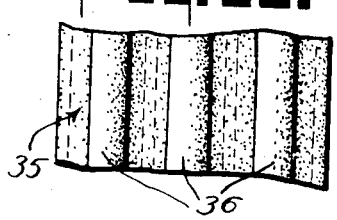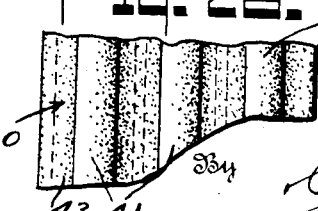

Patented Oct. 23, 1945

2,387,295

UNITED STATES PATENT OFFICE 2,387,295

CUSHION FOR CONDUIT AND WIRE SUPPORTING CLIPS

Archibald Robertson, North Hollywood, Calif., assignor to Adel Precision Products Corp., a corporation of California Application September 14, 1943, Serial No. 502,338

9 Claims. (Cl. 248—74)

This invention relates to clips or supports for holding conduits or wires in the desired position in aircraft and more particularly pertains to improvements in the soft rubber or soft synthetic rubber pads or cushions which constitute conduit-embracing or wire-embracing seats in such clips or supports for the purpose of protecting the conduits or wires against chafing and wear and absorbing or damping vibrations.

Heretofore in this art the cushions have depended upon softness and compressibility and considerable thickness in section to provide the desired cushioning and vibration damping action.

The present invention has for its primary object the provision of an improved cushion for the purpose described wherein the cushioning and vibration damping action is afforded and in fact desirably increased by reason of the particular construction thereof rather than due to the softness, compressibility, thickness and inherent qualities of the cushioning material, whereby material of thinner section and of considerable less elasticity and compressibility, in fact a comparatively thin and semi-hard yet flexible material of a less critical nature than soft rubber or soft synthetic rubber, may be used with a consequent appreciable saving of such critical material and a marked reduction in weight and manufacturing costs.

Another object of my invention is to provide a new cushion of the character described which readily lends itself to production by means of efficacious extrusion methods with a saving in costs and material.

A further object is to provide a cushion of the character described wherein the desired cushioning and vibration absorbing action is afforded by means of a protuberant or "built-up" portion on a body strip of comparatively thin section, and by reason of the relative flexibility of such protuberant or built-up portion and the fact that it presents a conduit or wire sustaining surface lying in circumferentially spaced relation to the inner surface of the body strip and extending the full length thereof, and does not depend on the compressibility or elasticity of the body strip.

With the foregoing objects in view, together with such other objects and advantages as may subsequently appear, the invention resides in the parts and in the combination, construction and arrangement of parts hereinafter described and claimed, and illustrated by way of example in the accompanying drawings, in which:

Fig. 1 is a part side elevational, part sectional view of a conduit clip embodying the present invention as installed;

Fig. 2 is a cross sectional view taken on the line 2—2 of Fig. 1;

Fig. 3 is a cross sectional view of the cushion as removed from the clip;

Fig. 4 is a fragmentary plan view of the cushion shown in Fig. 3;

Fig. 5 is a fragmentary sectional view similar to Fig. 2 showing a modified form of cushion as it would appear in use;

Fig. 6 is a cross section of the cushion shown in Fig. 5 removed from the clip;

Fig. 7 is a fragmentary plan view of the cushion shown in Fig. 6;

Fig. 8 is a sectional view similar to Fig. 2 of another modified form of cushion as it would appear when in use;

Fig. 9 is a cross sectional view of the cushion shown in Fig. 8 removed from the clip;

Fig. 10 is a fragmentary plan view of the cushion shown in Fig. 9;

Fig. 11 is a sectional view similar to Fig. 2 of a third modified form of cushion as in use;

Fig. 12 is a cross sectional view of the cushion shown in Fig. 11 removed from the clip;

Fig. 13 is a fragmentary plan view of the cushion shown in Fig. 12;

Fig. 14 is a view similar to Fig. 2 showing a fourth modified cushion as in use in an installed clip;

Fig. 15 is a cross section of the cushion shown in Fig. 14 as removed from the clip;

Fig. 16 is a fragmentary plan view of the cushion shown in Fig. 15;

Fig. 17 is a sectional view similar to Fig. 2 of a fifth modified form of cushion as used in an installed clip;

Fig. 18 is a cross section of the cushion shown in Fig. 17 as removed from the clip;

Fig. 19 is a fragmentary plan view of the cushion shown in Fig. 18;

Fig. 20 is a cross section similar to Fig. 2 showing a sixth modified form of cushion when in use;

Fig. 21 is a cross section of the cushion of Fig. 20 removed from the clip;

Fig. 22 is a fragmentary plan view of the cushion shown in Fig. 21;

Fig. 23 is a cross section similar to Fig. 2 of a seventh modified form of cushion as used in an installed clip;

Fig. 24 is a cross section of the cushion of Fig. 23 removed from the clip;

Fig. 25 is a fragmentary plan view of the cushion shown in Fig. 24;

Fig. 26 is a sectional view similar to Fig. 2 of an eighth modified form of cushion on an installed clip;

Fig. 27 is a cross section of the cushion of Fig. 26 as removed;

Fig. 28 is a fragmentary top plan view of the cushion shown in Fig. 27.

Referring now more specifically to the drawings, particularly to Figs. 1 and 2 thereof, it is seen that a conduit or wire supporting clip of the type with which my improved cushion is used comprises a relatively stiff strap 1 of metal or other suitable material formed into a loop for embracing a conduit or wires and provided with ear-like apertured ends 2 through which a fastening 3 is inserted to clamp the clip on a conduit or wire such as the conduit 4 here shown, and to secure it to a structural part 5 of an aircraft.

Throughout the drawings I have shown different forms of cushions and each is deemed to embody the present invention in that it includes a strip-like base or body portion adapted to lie upon the inner face of the strap of a clip such as the strap 1 shown in Figs. 1 and 2, as a support for a relatively flexible "built-up" or protuberant portion or member extending radially inward from the inner face of said body or base portion to provide a conduit or wire-embracing seat which by reason of formation and flexibility relative to the body strip rather than its elasticity or compressibility or softness or dependence on these qualities in the body portion, sustains the conduit or wire within the clip and serves as a protective and vibration damping pad.

The conduit or wire supporting formations projecting from the body strips in all the forms hereof are subject to flexure both laterally and inwardly relative to the body strip and therefore provide cushioned seats encircling and supporting the wires or conduits in the manner and for the purpose stated herein.

Another important feature of the present invention is that the conduit sustaining formation on the body strip of each form of the invention supports the conduit in circumferentially spaced relation to the body strip and does not depend upon any cushioning action of such strip.

The cushion shown in Figs. 1 to 4 inclusive comprises an elongated relatively thin strip-like body or base portion 6 formed of rubber, synthetic rubber or the like and which may be relatively stiff and hard inasmuch as it is not depended upon as in cushions heretofore made as a cushioning element, but merely serves as a base or support and lies flat upon the inner surface of the strap 1 so as to encircle the conduit 4.

Any suitable means may be employed to affix the base or body portion 6 to the strap 1 and as here shown flexible flanges 7 are provided on the longitudinal margins of the portion 6 as integral parts thereof to embrace the longitudinal edges and outer face of the strap as shown in Fig. 2.

Formed integral with the inner face of the body portion 6 and extending the full length thereof are protuberances in the form of hollow or tubular ribs 8 of nearly circular cross section and extremely thin-walled, the body portion 6 comprising a small part of "cylindrical" wall of each rib. As here shown each of the ribs 8 are extended parallel and adjacent to a longitudinal edge of the body strip 6. While I have shown but two such ribs three or more may obviously be used as this form of cushion constitutes a plurality of highly flexible tubular ribs.

By making the walls and ribs 8 of very thin sections and giving the ribs a tubular form they become quite flexible and serve as a most effective vibration damping and cushioning seat for the conduit 4 as shown in Fig. 2, with the ribs somewhat flattened out or collapsed but yet providing conduit-embracing and sustaining surfaces which are spaced inwardly and circumferentially from the body portion or strip 6.

It is now seen that these ribs need not be "soft cured" or thick walled to provide the desired cushioning action because the tubular formation and thin walls give the requisite supporting action and flexibility making it unnecessary to depend on the yieldability or compressibility of the material itself. Thus it is seen that non-critical material having a low rubber or synthetic rubber content or a material not even containing these ingredients but having considerable flexibility and other qualities corresponding to semi-hard rubber, may be used in making the entire cushion.

Figs. 5, 6 and 7 show a modified form of cushion embodying a thin base or body 9, flanges 10 and tubular ribs 11 all identical with the corresponding parts of the form of cushion shown in Figs. 1 to 4 inclusive except that the ribs 11 are split as at 12 along the longitudinal median line thereof to increase the flexibility of the ribs and provide for closer conformation thereof to the curvature of the conduit. Fig. 5 shows the positions assumed by these split ribs when supporting a conduit or a group of wires.

Figs. 8, 9 and 10 show another modified form of cushion embodying a base or body strip 13, flanges 14 and tubular ribs 15 identical with the corresponding parts in Figs. 1 to 4 inclusive except that a slit or split 16 extends longitudinally of each rib along the inner sides thereof where joined to the base or body strip 13. This arrangement affords added flexibility and the ribs appear as shown in Fig. 8 when supporting the conduit.

Figs. 11 to 13 inclusive show another modified form of my cushion wherein the body strip 17, flanges 18 and ribs 19 are of the same construction and arrangement as shown in Figs. 1 to 10 inclusive except that the ribs 19 have longitudinal slits or splits 20 along their outer sides where joined to the body strip, this arrangement being the opposite of that shown in Fig. 8.

Figs. 14, 15 and 16 show another modification wherein the body strip 21 and flanges 22 correspond to the body strip and flanges shown in Figs. 1 to 4, but the protuberant portions constitute tubular ribs 23 of inverted V-shape in cross section located in the substantially same relative position on the body strip as are the tubular ribs of circular section shown in the forms of the invention previously described. The ribs 23 are separated from the body strip by means of longitudinal slits 24 along the innermost walls of the ribs where they would otherwise be joined to the body strip, to increase the flexibility thereof. The apices of the inverted V-shaped ribs support the conduit as shown in Fig. 14, said ribs then collapsing to the extent shown, and affording flexible and cushioned seats having several points of contact per rib and reliably holding the conduit in place so that wear on the latter is prevented and vibrations thereof are effectively absorbed.

Figs. 17, 18 and 19 show another form of cushion embodying my invention wherein a body strip 25 and side or edge flanges 26 correspond to similar parts of previously described cushions hereof, but in which the protuberant conduit or wire supporting members formed integral with the strip 25, are in the form of longitudinal flanges or ribs 27 which are arcuate in cross section and extend convergently from the body strip and are reduced in thickness towards their outer longitudinal edges. These flanges or ribs provide a cushioned support for the conduit by reason of their flexibility and appear approximately as shown in Fig. 17 when supporting the conduit, each rib providing a wide seating surface and holding the conduit circumferentially spaced from the body strip as is the case with the other cushions hereof. Considering the parts 23 shown in Fig. 15 as flanges, the flanges are both located in a parallel spaced relation to the mid-width or median line of the body strip 25 and on opposite sides thereof, said flanges being deflectable and inclining toward the median line, and the same may be said of the parts 15 in Fig. 9 and the parts 27 in Fig. 18.

The flanges or ribs 19, 23 and 27, when viewed in cross section, are all seen to be so contoured as to cause their outer edges to abut against the body strip before said flanges begin to be flattened by compression. Thus preforming said flanges adds to their resistance to the compressive force and produces a better cushioning effect.

Figs. 20, 21 and 22 illustrate another modification of the cushion wherein the base or body strip 28 and the flanges 29 thereon are of the same construction, material and formation as the corresponding parts of the other forms of cushions hereinbefore described. In this modification the "built-up" or protuberant conduit or wire seating portion consists of a cellular structure 30 formed integral with the strip 28 in the nature of a plurality of integral or connected tubes of rectangular cross section presenting a flat seat or strip 31 corresponding in size and thickness to the base 28 but spaced therefrom by the wall or web members 32. In this cushion the cellular structure is quite flexible and affords requisite cushioning by reason of the thin-walled and cellular formation rather than due to softness or yieldability of the material itself. As shown in Fig. 20 the cellular structure will partially collapse when the clip is applied to the conduit but will support the conduit in circumferentially spaced relation to the body strip 28.

Figs. 23 to 25 show another modified form of cushion wherein the body strip 33, flanges 34 and cellular protuberant portion 34 are of the same formation as shown in Figs. 20 to 22, but the conduit supporting surface of the portion 35 is provided with a plurality of longitudinal solid ribs 36. These ribs as shown in Fig. 23 will engage the conduit at spaced points, while the portions 37 of the structure 35 lying on opposite sides of the ribs will also provide seating surfaces when the structure 35 is collapsed under the load of the conduit and the tightening of the clip. This arrangement affords a plurality of spaced conduit engaging ribs throughout the face of the structure 35 which is opposed to the conduit.

Figs. 26 to 28 show another modification wherein the base strip 38, flanges 39, cellular structure 40 and ribs 41 on the latter are of the same formation as shown in Figs. 23 to 25 except that the walls 42 of the cellular structure are initially bowed or bent to collapse in a predetermined direction or in other words in an inward direction as shown in Fig. 26. This collapsed portion of these walls lies under and supports the strip 43 as a reinforcing element as clearly shown in Fig. 6. Each wall is normally of V-shaped section. This arrangement provides greater strength yet affords the desired flexibility of the cushion without relying on the cushion qualities of the material itself.

It is now apparent that my improved cushion makes it unnecessary to use "soft-cured" rubber or synthetic rubber of considerable thickness as heretofore required in this art. Instead the material may be semi-hard and of much thinner section to the end that a less expensive and less critical material may be used satisfactorily.

Another advantage afforded by the cushion hereof is that it provides, when installed on a clip, for securely holding conduits or wires of various diameters as governed by its normal inside dimension to the fully constricted inside dimension.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a cushion for lining the conduit or wire embracing loop portion of a conduit or wire supporting clip, an elongated flexible body strip adapted to line the interior of such a loop portion, and a plurality of integral flanges projecting from and extending longitudinally of said strip with their outer portions subject to flexure relative to the body strip and adapted to support a conduit or wires in circumferentially spaced relation thereto, said flanges being so contoured in cross section as to cause their outer edges to abut the body strip before the flanges are flattened by compression.

2. In a cushion for lining the conduit or wire embracing loop portion of a conduit or wire supporting clip, an elongated flexible body strip adapted to line the interior of such a loop portion, and tubular flexible members formed integral with and extending longitudinally of said body strip for supporting a conduit or wires embraced by said loop portion.

3. In a cushion for lining the conduit or wire embracing loop portion of a conduit or wire supporting clip, an elongated flexible body strip adapted to line the interior of such a loop portion, and tubular flexible members formed integral with and extending longitudinally of said body strip for supporting a conduit or wires embraced by said loop portion, said members being split longitudinally and arranged to flex inwardly relative to said body strip.

4. In a cushion for lining the conduit or wire embracing loop portion of a conduit or wire supporting clip, an elongated flexible body strip adapted to line the interior of such a loop portion, and flexible members extending longitudinally of and formed integral with and projecting from said body member, said flexible members being arcuate in cross section so that their outer portions are flexible inwardly relative to the body strip and will support a conduit or wires in circumferentially spaced relation to the body strip.

5. In a cushion for lining the conduit or wire embracing loop portion of a conduit or wire supporting clip, an elongated flexible body strip adapted to line the interior of such a loop portion, and a cellular member projecting from and extending longitudinally of the body strip and presenting a conduit embracing and supporting surface which is inwardly flexible relative to the body strip and supports the conduit or wires in circumferentially spaced relation to the body strip.

6. In a cushion for lining the conduit or wire embracing loop portion of a conduit or wire supporting clip, an elongated flexible body strip adapted to line the interior of such a loop portion, and a flexible flange extending longitudinally of and projecting inwardly from said body strip in a spaced parallel relation to each side of its mid-width, and providing an inwardly flexible conduit or wire embracing and cushioning seat which is circumferentially spaced from the strip and so remains when the conduit or wires are supported thereby, said flanges both being inclined toward the mid-width of the body strip and being so contoured in cross section as to cause their outer edges to abut the body strip before said flanges are flattened by compression.

7. In a cushion for lining the conduit or wire embracing loop portion of a conduit or wire supporting clip, an elongated flexible body strip adapted to line the interior of such a loop portion, and tubular flexible members formed integral with and extending longitudinally of said body strip for supporting a conduit or wires embraced by said loop portion, said members being of an inverted V-shape with their apical portions disposed to engage the conduit or wires.

8. As an article of manufacture, a cushion for lining the loop portion of a conduit or wire supporting clip comprising an elongated body portion provided with integral means coextensive with its length for attachment to a clip and with an equally coextensive integral cushioning flange element projecting outwardly from said body portion and thence laterally to provide a relatively wide face for cushioning engagement for a conduit or wire encircled by the clip.

9. In a cushion for lining the conduit or wire embracing loop portion of a conduit or wire supporting clip, an elongated flexible body strip adapted to line the interior of such a loop portion, and an integral flange projecting from said body strip and extending lengthwise thereof, said flange being pre-formed to cause its outer edge to bend back toward and contact the body strip before said flange is completely flattened by compression.

ARCHIBALD ROBERTSON.